US007079016B2

(12) United States Patent
Ho et al.

(10) Patent No.: US 7,079,016 B2
(45) Date of Patent: Jul. 18, 2006

(54) VEHICLE-BASED VEHICLE OCCUPANT REMINDER USING WEIGHT-BASED SENSOR

(75) Inventors: Li-Pen J Ho, Farmington Hills, MI (US); Galen E. Ressler, White Lake, MN (US); Veronica M Yahkind, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 130 days.

(21) Appl. No.: 10/930,324

(22) Filed: Aug. 31, 2004

(65) Prior Publication Data

US 2006/0044126 A1 Mar. 2, 2006

(51) Int. Cl.
*B60R 25/10* (2006.01)

(52) U.S. Cl. ................. 340/426.25; 340/667; 180/273; 200/85 A

(58) Field of Classification Search ........... 340/426.25, 340/426.29, 666, 667; 180/271, 273; 200/85 A
See application file for complete search history.

(56) References Cited

U.S. PATENT DOCUMENTS 6,104,293 A * 8/2000 Rossi ...................... 340/573.1
6,317,034 B1 * 11/2001 Issa et al. .............. 340/426.25
6,490,515 B1 * 12/2002 Okamura et al. ............. 701/49
6,662,094 B1 * 12/2003 Murphy et al. ............... 701/45
6,727,823 B1 * 4/2004 Ando et al. ................. 340/666
6,870,472 B1 * 3/2005 Gift et al. .................... 340/457
6,922,147 B1 * 7/2005 Viksnins et al. ......... 340/573.1

* cited by examiner

*Primary Examiner*—John Tweel, Jr.
(74) *Attorney, Agent, or Firm*—Laura C. Hargitt

(57) ABSTRACT

Methods and apparatus are provided for providing an indication to a person external to a vehicle, of an occupant inside the vehicle. The method comprises determining whether a first object in the vehicle is an occupant, based, in part, on a weight of the first object; sensing whether an ignition of the vehicle is in an off position; detecting whether a first door coupled to the vehicle has been opened and closed, if the vehicle ignition is in an off position; if the first door has been opened and closed and an occupant is in the vehicle, measuring a first time ($T_1$) from an instant the first door is closed to an instant after the first door is closed; and activating the alert, if $T_1$ is greater than a predetermined threshold time ($T_{threshold}$).

32 Claims, 3 Drawing Sheets

VEHICLE-BASED VEHICLE OCCUPANT REMINDER USING WEIGHT-BASED SENSOR

TECHNICAL FIELD

The present invention generally relates to alert systems, and more particularly a system for alerting a person outside of a vehicle of the presence of a person or being inside the vehicle.

BACKGROUND

Research has shown that an occupant who is left in a closed, parked vehicle for an extended amount of time on a hot or sunny day may face the possibility of suffering from a physical injury due to the heat and humidity that may be present in the automobile. Several types of products are available that provide various safety features intended to prevent injuries of these types. One common product used by drivers or adults responsible for transporting children is a child safety seat.

For the most part, child safety seats have been designed to accommodate and protect a child in the event of a vehicular collision. In recent years, child seat technology has become more sophisticated. Some child seats are now configured to detect the presence of a child in the child seat. Other child safety seats may operate in conjunction with some type of wireless transceiver, wherein the child seat sends signals to the transceiver regarding the presence of the child within the seat.

Although child seat assemblies of these types are useful, they may present certain drawbacks. For example, the wireless transceiver is typically capable of being carried from location to location. Thus, if a driver is in possession of the transceiver and fails to provide it to a subsequent driver, the subsequent driver may not receive the alert from the transceiver. Therefore, the subsequent driver will not be notified or reminded of the presence of the occupant in the vehicle. Moreover, because the wireless transceiver is transportable, it may become misplaced or may be lost.

Furthermore, child seat assemblies of this type are not useful in the protection of other occupants, such as older children or persons that do not fit into the child seat and who may be inadvertently left in an unattended, closed vehicle.

Accordingly, it is desirable to provide a device that is capable of alerting a person or driver who is outside of an automobile to an occupant inside of the automobile. In addition, it is desirable to provide an alert system that is useful for all drivers who operate the automobile. Furthermore, other desirable features and characteristics of the present invention will become apparent from the subsequent detailed description of the invention and the appended claims, taken in conjunction with the accompanying drawings and this background of the invention.

BRIEF SUMMARY

A method is provided for providing an indication to a person external to a vehicle, of an occupant inside the vehicle. The method comprises determining whether a first object in the vehicle is an occupant, based, in part, on a weight of the first object; sensing whether an ignition of the vehicle is in an off position; detecting whether a first door coupled to the vehicle has been opened and closed, if the vehicle ignition is in an off position; if the first door has been opened and closed and an occupant is in the vehicle, measuring a first time ($T_1$) from an instant the first door is closed to an instant after the first door is closed; and activating the alert, if $T_1$ is greater than a predetermined threshold time ($T_{threshold}$).

Another method is provided for providing an alert to a person external to a vehicle of an occupant in the vehicle. The method comprises the steps of determining whether a first object in the vehicle is an occupant, based, in part, on a weight of the first object; sensing whether an ignition of the vehicle is in an off position; detecting whether a first door coupled to the vehicle has been opened and closed, if the vehicle ignition is in an off position; sensing whether the first door and a second door coupled to the vehicle have been locked; and if the first and second doors have been locked and an occupant is in the vehicle, activating the alert.

An apparatus is provided for providing an indication to a person external to a vehicle, of an occupant inside the vehicle, the vehicle having a seat and at least a first and a second door. The apparatus comprises a weight sensor, a controller, a door sensor, ignition indicator and an alert. The weight sensor is operatively coupled to at least a portion of the vehicle to sense a weight of an object disposed inside of the vehicle. The controller is electrically coupled to the weight sensor and configured to determine whether the object is an occupant, based in part, on the sensed weight of the object in the vehicle. The door sensor is coupled to the controller and configured to sense the opening and closing of the first and second doors. The ignition indicator is coupled to the controller and configured to sense whether an ignition of the vehicle is in an off position. The alert is electrically coupled to the controller and configured to produce a signal external the vehicle if the controller determines that the object is an occupant and if, after the first door was closed, the second door has not been opened within a predetermined threshold time.

Another apparatus is provided for providing an indication to a person external to a vehicle, of an occupant inside the vehicle, the vehicle having a seat and at least a first and a second door. The apparatus comprises a weight sensor, a controller, a door sensor, ignition indicator and an alert. The weight sensor is operatively coupled to at least a portion of the vehicle to sense a weight of an object disposed inside of the vehicle. The controller is electrically coupled to the weight sensor and configured to determine whether the object is an occupant, based in part, on the sensed weight of the object in the vehicle. The door sensor is coupled to the controller and configured to sense the opening and closing of the first and second doors. The ignition indicator is coupled to the controller and configured to sense whether an ignition of the vehicle is in an off position. The alert is electrically coupled to the controller and configured to produce a signal external the vehicle if the controller determines that the object is an occupant and if after the first door has been shut, the first and second doors have been locked.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the drawings.

Figure 1:
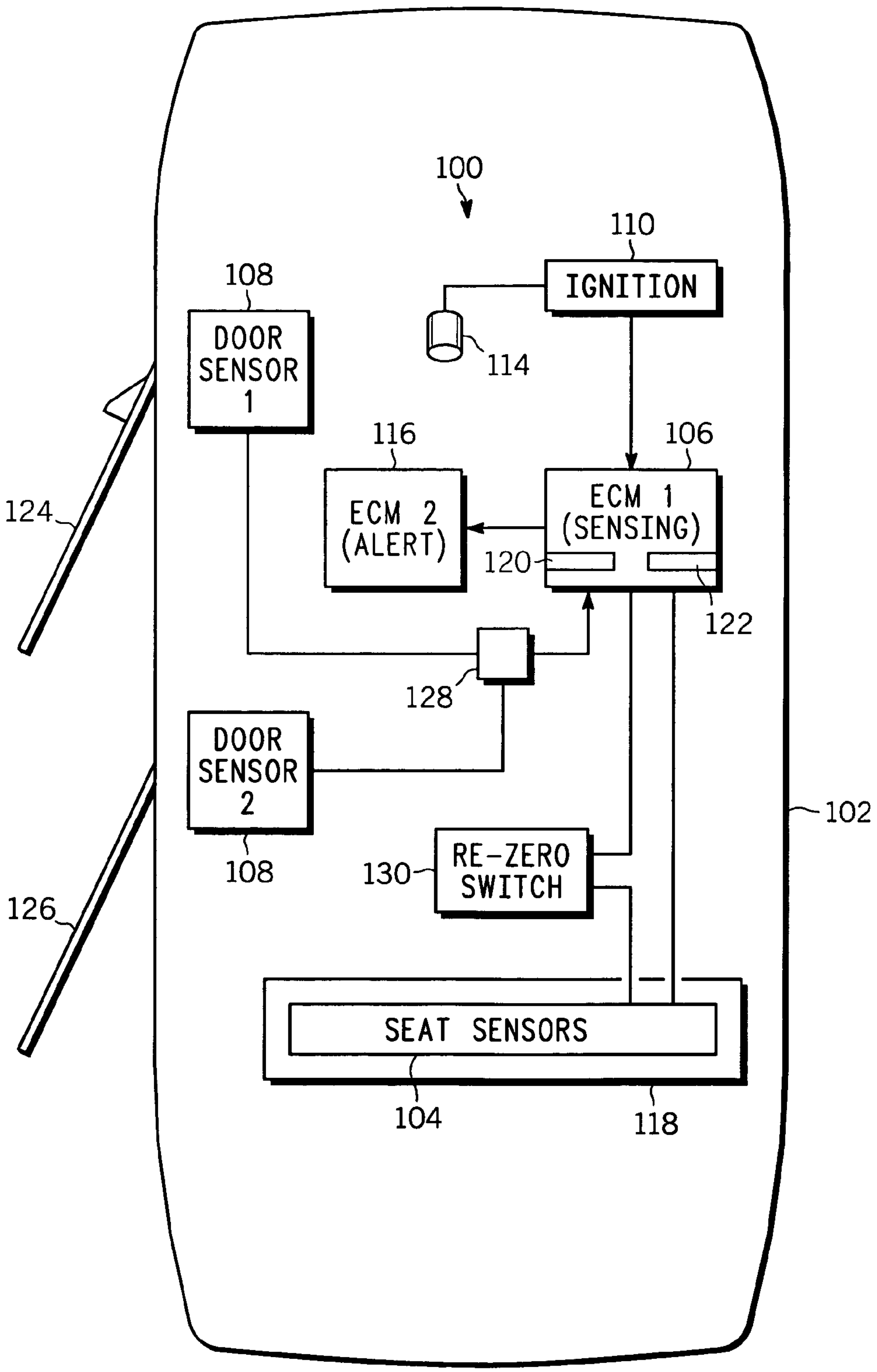
FIG. 1 is a block diagram of an exemplary occupant alert system.

An exemplary embodiment of an occupant alert system 100 for an automobile 102 is provided and shown in block diagram form in FIG. 1. The occupant alert system 100 is implemented into the automobile 102 to alert persons external to the automobile 102 of an occupant that may be inside the automobile 102. The occupant alert system 100 includes at least one weight sensor 104 that communicates weight data to a sensor electronic control module (ECM) or controller 106. The sensor ECM 106 is also operatively coupled to a door sensor 108 and a portion of an ignition module 110. The sensor ECM 106 is configured to receive signals from the door sensor 108 indicating whether one or more of the doors 124, 126 coupled to the automobile 102 is opened or closed, and from the ignition module 110 as to whether the ignition 114 has been turned off. An alert ECM 116 is also coupled to the sensor ECM 106 and is configured to cause an alert or alarm in the event an occupant is left in the vehicle for over a predetermined amount of time. Each of these components will now be discussed.

Figure 2:
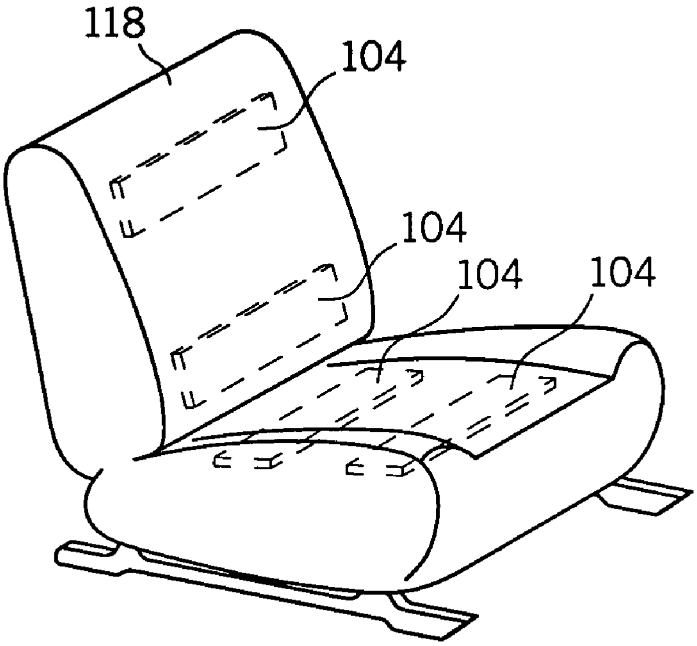
FIG. 2 is an illustration of an exemplary seat that may be employed in the exemplary occupant alert system depicted in FIG. 1.

The weight sensor 104 is at least partially located in a seat 118 that is disposed within the automobile 102, and is configured to sense a weight that may be present on the seat 118. The weight sensor 104 may be located in any one of the seats 118 that may be disposed within the automobile 102, including the front passenger, rear row, or rear seats. More preferably, the sensor 104 is located in at least one of the seats or rows of seats where an occupant may sit or lay, a child seat may be located, or where a driver may not remember to look, such as rear seats. As illustrated in FIG. 2, the weight sensor 104 can also be positioned on any portion of the seat 118. For instance, the sensors 104 can be positioned in the bottom seat cushion, or within the back cushion. Depending on the design of the seat 118 itself, the sensor 104 may be placed under or in the upholstery of the seat 118 or embedded within or under the foam cushion of the seat 118 or with the metal structure of the seat 118. Although only one weight sensor 104 is referred to herein, those skilled in the art will recognize that any number of weight sensors may be used.

The weight sensor 104 is preferably configured to sense weight or force that is exerted on a seating surface. Any one of numerous types of sensors capable of sensing weight and that is appropriate for use on an automotive vehicle may be employed. Examples of suitable types of weight sensors include, but are not limited to load cell sensors, force sensitive resistors, and fluid-filled bladders. Moreover, although a weight sensor 104 is referred to herein, a sensor wherein a change of pressure exerted against the seat 118 may also be used. Once the appropriate data is collected it is then communicated to and received by the controller 106.

Returning to FIG. 1, the sensor ECM 106 includes at least a processor 120 that operates in conjunction with a memory 122. The processor 120 is configured to compare the collected weight, force, or pressure data with a predetermined threshold weight, force, or pressure to determine whether or not an occupant is on the seat 118. The predetermined threshold weight, force, or pressure may be set and programmed to a preferred setting into the processor 120 and/or memory 122 at any time during manufacture of the automobile, or alternatively, the threshold may be subsequently increased or decreased. For weight data, the predetermined threshold weight is preferably about four to twelve (4–12) pounds and most preferably about five (5) pounds.

The sensor ECM 106 may optionally be coupled to a re-zero switch 130 that may receive a manual input to disregard a weight or force exerted by an object that may be temporarily or permanently coupled to the seat 118 or seating surface, such as a child safety seat or other passenger restraint device. The re-zero switch 130 is configured to allow an operator to cause the processor 120 to take into account the weight of the object that is on the seat 118. Thus, the re-zero switch 130 provides a means to re-calibrate the weight sensor 104 so that if additional weight or force, such as the weight of an occupant, is exerted against the seat 118, the weight sensor 104 only senses the additional weight. Once the re-zero switch 130 is activated, the sensor ECM 106 can be programmed to automatically re-zero or re-calibrate with any sensed decrease in weight or pressure exerted against the seat 118. Alternatively, the sensor ECM 106 can be programmed to automatically activate the re-zero switch if a weight or pressure is exerted against the seat 118 for a prolonged amount of time.

As previously mentioned, the sensor ECM 106 is also coupled to a door sensor 108. The door sensor 108 is coupled to a door 124 of the automobile 102 and configured to provide data to the sensor ECM 106 as to whether the door 124 has been opened, closed, locked, or unlocked. Any one of numerous types of sensors suitable for detecting whether a door 124 is open or closed or locked or unlocked may be employed. The door sensor 108 may also be coupled to a second door 126, or some or all of the remaining doors, so as to determine whether those doors have been opened or closed or locked or unlocked. Alternatively, separate door sensors 108 may be coupled to the other doors 126 to sense the opening or closing or locking or unlocking of the doors.

The sensor ECM 106 is also in communication with the ignition module 110. The sensor ECM 106 senses whether the ignition is off to determine whether to activate the system 100.

These door sensor 108 and ignition module 110 each provide serial data to the sensor ECM 106 that aid the sensor ECM 106 in the determination of whether to send a signal to the alert ECM 116.

A timing mechanism 128 is coupled to the door sensors 108. The timing mechanism is configured to activate and measure various time periods, such as from the moment that the door sensor 108 senses that the first door 124 has been open and subsequently shut, to the moment the second door 126 has been opened. The timing mechanism 128 may be configured to reset when the second door 126 has been shut and if a weight that is greater than the predetermined threshold weight remains on the seat 118. The timing mechanism 128 may be integrated into a single component embedded in the system 100, or alternatively, incorporated into the sensor ECM 106, or can be a separate timer component. As appreciated by those with skill in the art, the timing mechanism 128 may also be set to measure any other times that may be useful in determining whether an occupant has remained in the automobile 102 for an unacceptable length of time.

The timing mechanism 128 sends the collected timing data to the sensor ECM 106, which compares the measured time with a predetermined threshold time ($T_{safe}$) that may be stored in its memory 122. The predetermined threshold time is preferably an acceptable time period within which a driver or other person can reasonably attend to the occupant after the driver exits the vehicle from the first door 124. In one embodiment, the predetermined threshold time may be between about two to twenty (2–20) seconds, more preferably about ten (10) seconds.

If the sensor ECM 106 determines that the occupant has remained in the automobile 102 for a time period that is greater than the predetermined threshold time, the sensor ECM 106 is configured to send a serial data message to the alert ECM 116 to activate an alert. The alert ECM 116 can be configured to produce any one of numerous types of alarm or alert mechanisms that can be used to notify the driver that an occupant may be in the automobile 102. In one embodiment, the alert ECM 116 is coupled to an automobile horn. As appreciated by those with skill, the horn can be a typical car horn sound, or a different sound that can be associated with an alert alerting others that an occupant may be in the automobile 102. In another embodiment, the alert ECM 116 can be coupled to a separate audible noise that is not associated with the car horn. In yet another embodiment, the alert ECM 116 may be coupled to a visual alert, such as flashing car headlights or some other type of visible indication. As those familiar with the art may appreciate, one or more of these alerts may be used in conjunction with one another. In yet another embodiment, the form of alert may be a few short horn sounds.

Figure 3:
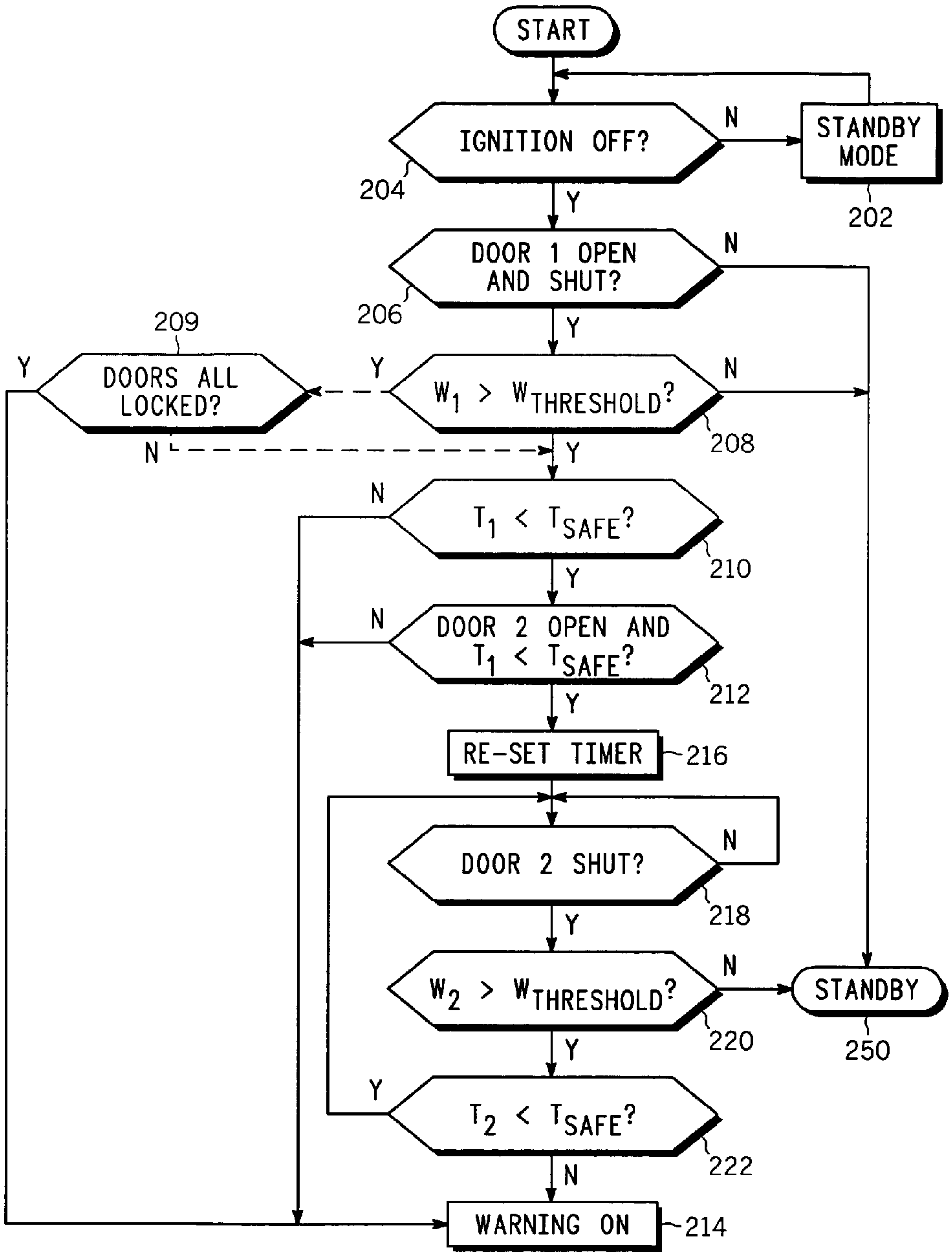
FIG. 3 is a flow diagram of an exemplary method for implementing an occupant alert system.

Turning to FIG. 3, an embodiment of one of the methods by which to operate the occupant alert system 100 will now be discussed. Although each step herein is discussed as if they are to be performed in a particular order, it will be appreciated that some of the steps need not be performed in the described order and that some steps may be performed simultaneously, or before or after another step that may be described in the method. In any event, each of the steps referred to in FIG. 3 are referenced herein by parentheticals.

While the automobile 102 is in operation or when the system 100 is not activated, the system 100 is in a sleep or standby mode (202). The system 100 is activated when the sensor ECM 110 senses that the ignition 114 has been shut off (204). The sensor ECM 110 then detects via the door sensor 108 whether a first door 124 is opened and subsequently shut (206). If the first door 124 is opened, but not shut, the controller 106 causes the system to return to standby mode (250). If the first door 124 is opened and subsequently shut, the sensor ECM 106 causes the weight sensor 104 to sense whether a weight or force is present on the seat 118 (208). Specifically, the weight sensor 104 collects the weight data and sends the data to the sensor ECM 106 to determine whether the weight is above or below a predetermined threshold weight ($W_{threshold}$) that is stored within the controller memory 122. If the weight sensor 104 detects a weight ($W_{init}$) that is below a predetermined threshold weight ($W_{threshold}$), then the controller 106 assumes that no occupant is present on the seat 118 and the system returns to standby mode (250). If the weight sensor 104 detects a weight that is above the predetermined threshold weight, the timing mechanism 128 is activated and begins to track the time from the closing of the first door 124 so that a determination can be made as to whether the tracked time ($T_1$) is greater than the predetermined threshold time ($T_{safe}$) (210). Alternatively, if $W_{init}$ is greater than $W_{threshold}$ and the sensor ECM 106 detects that all of the doors 112, 126 are locked (209), time is not tracked and the sensor ECM 106 sends a serial data message to the alert ECM 116 to activate the alert (214)

If time is tracked, the sensor ECM 106 detects whether the second door 126 has been opened within $T_{safe}$ (212). If $T_1$ is more than $T_{safe}$, then the sensor ECM 106 sends a serial data message to the alert ECM 116 to activate an alert (214). If $T_1$ is less than $T_{safe}$, then the timing mechanism 128 is reset (216) to track additional time (T2). The sensor ECM 106 then senses whether the second door 126 has been shut (218). If the second door 216 has been shut, then the sensor ECM 106 senses whether a weight ($W_2$) is on the seat 118 and determines whether $W_2$ is greater than $W_{threshold}$ (220). If $W_2$ is less than $W_{threshold}$, then the system returns to standby mode (250). If $W_2$ is greater than $W_{threshold}$, then the sensor ECM 106 compare $T_2$ to $T_{safe}$ (222). If $T_2$ is less than $T_{safe}$, then the system 100 continues to detect whether the second door 216 is shut. If $T_2$ is greater than $T_{safe}$, then the sensor ECM 106 sends a serial data message to the alert ECM 116 to activate the alert (214).

In another embodiment, the system 100 includes a re-zero switch 130. If a child seat or some other object is permanently or temporarily coupled to the seat 118, the automobile operator can activate the re-zero switch 130. Alternatively, the re-zero switch and sensor ECM 106 can be configured to sense the weight of an object coupled to the seat 118 ($W_3$) based on the duration for which the object may exert constant force or pressure against with the weight sensors 104. In such case, the re-zero switch is activated with no human intervention. If the re-zero switch has been activated, then the sensor ECM 106 re-calibrates and "re-zeroes" to disregard $W_3$. After calibration, the system 100 can be configured to operate via the method disclosed in FIG. 3

Thus, there has been provided a system for alerting a person external to an automobile of an occupant inside the automobile. While an exemplary embodiment(s) has been presented in the foregoing detailed description of the invention, it should be appreciated that a vast number of variations exist. It should also be appreciated that these exemplary embodiments are only examples, and are not intended to limit the scope, applicability, or configuration of the invention in any way. Rather, the foregoing detailed description will provide those skilled in the art with a convenient road map for implementing a preferred embodiment of the invention. It being understood that various changes may be made in the function and arrangement of elements described in an exemplary preferred embodiment without departing from the spirit and scope of the invention as set forth in the appended claims.

What is claimed is:

1. A method for providing an alert to a person external to a vehicle of an occupant in the vehicle, comprising the steps of:

determining whether a first object in the vehicle is an occupant, based, at least in part, on a weight of the first object;

sensing whether an ignition of the vehicle is in an off position;

detecting whether a first door coupled to the vehicle has been opened and closed, if the vehicle ignition is in an off position;

if the first door has been opened and closed and an occupant is in the vehicle, measuring a first time ($T_1$) from an instant the first door is closed to an instant after the first door is closed; and activating the alert, if $T_1$ is greater than a predetermined threshold time ($T_{threshold}$).

2. The method of claim 1, further comprising:

determining whether a second door coupled to the vehicle has been opened.

3. The method of claim 2, wherein measuring $T_1$ comprises measuring $T_1$ from the instant the first door is closed to an instant that the second door is open.

4. The method of claim 1 wherein the first object is located on the seat and wherein the step of determining whether a first object is an occupant further comprises:

sensing the weight of the first object on the seat;

comparing the sensed weight to a predetermined weight; and determining that an occupant is in the vehicle, if the sensed weight is greater than the predetermined weight.

5. The method of claim 4, wherein the predetermined weight is about four (4) pounds.

6. The method of claim 1, wherein the predetermined threshold time is between about 2–20 seconds.

7. The method of claim 1, wherein the alert is a horn coupled to the vehicle.

8. The method of claim 1, wherein the alert is a visual indicator.

9. The method of claim 1, further comprising:

sensing a weight of a second object; and calibrating the system to disregard the weight of the second object when sensing the weight of the first object.

10. A method for providing an alert to a person external to a vehicle of an occupant in the vehicle, comprising the steps of:

determining whether a first object in the vehicle is an occupant, based, at least in part, on a weight of the first object;

sensing whether an ignition of the vehicle is in an off position;

detecting whether a first door coupled to the vehicle has been opened and closed, if the vehicle ignition is in an off position;

sensing whether the first door and a second door coupled to the vehicle have been locked; and if the first and second doors have been locked and an occupant is in the vehicle, activating the alert.

11. The method of claim 10 wherein the first object is located on the seat and wherein the step of determining whether a first object is an occupant further comprises:

sensing the weight of the first object on the seat;

comparing the sensed weight to a predetermined weight; and determining that an occupant is in the vehicle, if the sensed weight is greater than the predetermined weight.

12. The method of claim 10, wherein the predetermined weight is about four (4) pounds.

13. The method of claim 10, wherein the alert is a horn coupled to the vehicle.

14. The method of claim 10, wherein the alert is a visual indicator.

15. An alert system for providing an indication to a person external to a vehicle, of an occupant inside the vehicle, the vehicle having a seat and at least a first and a second door, the system comprising:

a weight sensor operatively coupled to at least a portion of the vehicle to sense a weight of an object disposed inside of the vehicle;

a controller electrically coupled to the weight sensor and configured to determine whether the object is an occupant, based at least in part, on the sensed weight of the object in the vehicle;

a door sensor coupled to the controller and configured to sense the opening and closing of the first and second doors;

an ignition indicator coupled to the controller and configured to sense whether an ignition of the vehicle is in an off position; and an alert electrically coupled to the controller and configured to produce a signal external the vehicle if the controller determines that the object is an occupant and if, after the first door was closed, the second door has not been opened within a predetermined threshold time.

16. The system of claim 15, further comprising: a timer coupled to the door sensor and controller.

17. The system of claim 15, wherein the controller is further configured to de-activate the alarm, if the second door has been opened after the predetermined threshold time.

18. The system of claim 15, wherein the alert is an audible indicator.

19. The system of claim 18, wherein the alert is a vehicle horn.

20. The system of claim 15, wherein the alert is a visual indicator.

21. The system of claim 15, wherein the visual indicator is a flashing light.

22. The system of claim 15, further comprises:

a re-zero switch operatively coupled to the controller and configured to selectively disregard a weight on the seat.

23. The system of claim 22, wherein the re-zero switch is coupled to the weight sensor.

24. An alert system for providing an indication to a person external to a vehicle, of an occupant inside the vehicle, the vehicle having a seat and at least a first and a second door, the system comprising:

a weight sensor operatively coupled to at least a portion of the vehicle to sense a weight of an object disposed inside of the vehicle;

a controller electrically coupled to the weight sensor and configured to determine whether the object is an occupant, based at least in part, on the sensed weight of the object in the vehicle;

a door sensor coupled to the controller and configured to sense the opening, closing and locking of the first and second doors;

an ignition indicator coupled to the controller and configured to sense whether an ignition of the vehicle is in an off position; and an alert electrically coupled to the controller and configured to produce a signal external the vehicle if the controller determines that the object is an occupant and if after the first door has been shut, the first and second doors have been locked.

25. The system of claim 24, further comprising:

a timer coupled to the door sensor and controller.

26. The system of claim 24, wherein the controller is further configured to de-activate the alarm, if the second door has been opened after the predetermined threshold time.

27. The system of claim 24, wherein the alert is an audible indicator.

28. The system of claim 27, wherein the alert is a vehicle horn.

29. The system of claim 24, wherein the alert is a visual indicator.

30. The system of claim 24, wherein the visual indicator is a flashing light.

31. The system of claim 24, further comprises:

a re-zero switch operatively coupled to the controller and configured to selectively disregard a weight on the seat.

32. The system of claim 31, wherein the re-zero switch is coupled to the weight sensor.

* * * * *